US011915162B2

(12) United States Patent
Watson et al.

(10) Patent No.: US 11,915,162 B2
(45) Date of Patent: Feb. 27, 2024

(54) ALERT SYSTEM WITH MACHINE LEARNING AND FUZZY LOGIC

(71) Applicant: International Business Machines Corporation, Armonk, NY (US)

(72) Inventors: Campbell D. Watson, Brooklyn, NY (US); Eli M. Dow, Wappingers Falls, NY (US); Frank Liu, Austin, TX (US); Fearghal O'Donncha, Aran Islands (IE); Ernesto Arandia, Viareggio (IT)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 16/202,888

(22) Filed: Nov. 28, 2018

(65) Prior Publication Data

US 2020/0167682 A1    May 28, 2020

(51) Int. Cl.
| | | |
|---|---|---|
| *G06F 17/00* | (2019.01) | |
| *G06N 7/02* | (2006.01) | |
| *G06N 20/00* | (2019.01) | |
| *G06F 9/54* | (2006.01) | |
| *C02F 1/00* | (2023.01) | |
| *G06F 18/214* | (2023.01) | |

(52) U.S. Cl.
CPC ............. *G06N 7/023* (2013.01); *C02F 1/008* (2013.01); *G06F 9/542* (2013.01); *G06F 18/214* (2023.01); *G06N 7/02* (2013.01); *G06N 20/00* (2019.01)

(58) Field of Classification Search
CPC .......... G06N 7/02; G06N 20/00; G06N 7/023; C02F 1/008; G06F 9/542; G06F 18/214; G06K 9/6256; G06Q 10/00

USPC ......................................................... 706/52
See application file for complete search history.

(56) References Cited

U.S. PATENT DOCUMENTS

| | | | |
|---|---|---|---|
| 5,284,523 A | 2/1994 | Badami | |
| 5,419,146 A | 5/1995 | Sibik | |
| 5,516,233 A | 5/1996 | Courtney | |
| 5,544,256 A * | 8/1996 | Brecher | ............... G06T 7/0006 706/900 |
| 5,907,281 A | 5/1999 | Miller, Jr. | |
| 2004/0250124 A1* | 12/2004 | Chesla | .................. G06F 21/552 709/224 |
| 2006/0187017 A1 | 8/2006 | Kulesz | |
| 2011/0320134 A1 | 12/2011 | Butler | |
| 2014/0167969 A1* | 6/2014 | Wedig | .................. G08B 25/007 340/584 |
| 2017/0076217 A1* | 3/2017 | Krumm | .................. G06Q 10/00 |

(Continued)

FOREIGN PATENT DOCUMENTS

| | | |
|---|---|---|
| CN | 102565294 B | 10/2014 |
| CN | 104680037 A | 6/2015 |

*Primary Examiner* — Jason T Edwards
(74) *Attorney, Agent, or Firm* — Stephen R. Yoder

(57) ABSTRACT

A method, computer program product and computer system to generate safety alerts is provided. A processor retrieves a plurality of measurements associated with a location. A processor determines a set of features based on the plurality of measurements. A processor identifies a set of membership functions for the set of features. A processor determines a safety index for the body of water based on the set of membership functions and one or more input value ranges for the set of features. In response to the safety index being above a threshold value, a processor sends an alert to one or more users regarding the location.

20 Claims, 5 Drawing Sheets

(56) References Cited

U.S. PATENT DOCUMENTS

2018/0018670 A1* 1/2018 Ju .......................... G06N 5/048
2018/0285343 A1* 10/2018 Chen ...................... G06F 40/30

* cited by examiner

ALERT SYSTEM WITH MACHINE LEARNING AND FUZZY LOGIC

BACKGROUND OF THE INVENTION

The present invention relates generally to the field of safety alerts, and more particularly to machine learning.

Safety alerts includes identifying safety issues in, on and around a location, where there is a risk to either members of the public or a private organization. Typical approaches to determine unsafe conditions only utilize a limited set of metrics and are rarely changed or updated. Machine learning is a field of artificial intelligence directing towards generating a predictive model. Based on a learning or feedback process, machine learning updates and alters the model to provide more accurate predictions. Fuzzy logic is an approach that instead of a typical yes or no, or binary, decision being provided, a degree of truth or range between the typical binary answer is derived.

SUMMARY

Embodiments of the present invention provide a method, system, and program product to generate safety alerts is provided. A processor retrieves a plurality of measurements associated with a location. A processor determines a set of features based on the plurality of measurements. A processor identifies a set of membership functions for the set of features. A processor determines a safety index for the body of water based on the set of membership functions and one or more input value ranges for the set of features. In response to the safety index being above a threshold value, a processor sends an alert to one or more users regarding the location.

DETAILED DESCRIPTION

Figure 1:
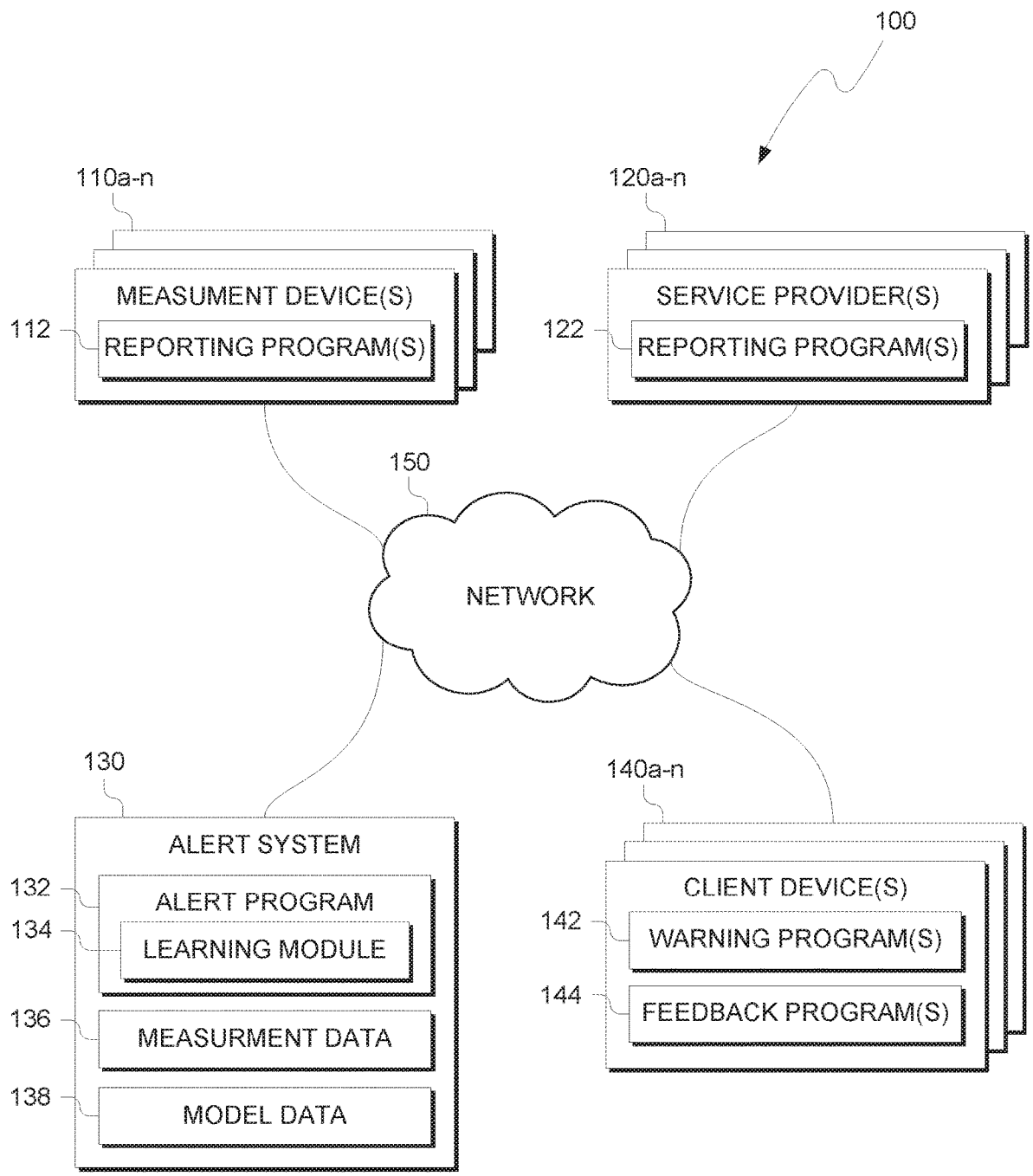
FIG. 1 is a functional block diagram illustrating a networked environment, in accordance with an exemplary embodiment of the present invention.

While solutions alert systems are known, they typically only consider a few measurements when generating an alert. For example, water safety for a location can be important to both public (e.g., beach attendees) or private (e.g., a port) entities. Prior water safety alert systems would only look at a metric such as microbial or algae content. Furthermore, prior water safety alert systems would typically be specifically designed for a given areas acceptable levels for use by the public or private sectors, with the measurements monitored and the acceptable amounts being unchanged. Embodiments of the present invention recognize that by including multiple features, selecting and removing the features from a set, and using the selected feature set in a fuzzy logic model, that improvements in accuracy and robustness of a water safety alert systems are provided. By utilizing unsupervised and supervised machine learning techniques, embodiments of the present invention provide improvements to the accuracy of water safety alert systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes measurement devices 110*a-n*, service providers 120*a-n*, alert system 130 and client devices 140*a-n* connected over network 150. Measurement devices 110*a-n* include reporting program 112. Service providers 120*a-n* include reporting program 122. Alert system 130 includes alert program 132, learning module 134, measurement data 136, and model data 138. Client devices 140*a-n* include warning program 142 and feedback program 144.

In various embodiments of the present invention, measurement devices 110*a-n*, service providers 120*a-n*, alert system 130 and client devices 140*a-n* are each a computing device that can be a standalone device, a server, a laptop computer, a tablet computer, a netbook computer, a personal computer (PC), or a desktop computer. In another embodiment, measurement devices 110*a-n*, service providers 120*a-n*, alert system 130 and client devices 140*a-n* each, collectively or some combination thereof represent a computing system utilizing clustered computers and components to act as a single pool of seamless resources. In general, measurement devices 110*a-n*, service providers 120*a-n*, alert system 130 and client devices 140*a-n* can be any computing device or a combination of devices with access to reporting program 112, reporting program 122, alert program 132, learning module 134, measurement data 136, model data 138, warning program 142 and feedback program 144. Measurement devices 110*a-n*, service providers 120*a-n*, alert system 130 and client devices 140*a-n* may include internal and external hardware components, as depicted and described in further detail with respect to FIG. 5.

In this exemplary embodiment reporting program 112 is stored on measurement devices 110*a-n*. Reporting program 112 is stored on service providers 120*a-n*. Alert program 132, learning module 134, measurement data 136, and model data 138 are stored on alert system 130. Warning program 142 and feedback program 144 are stored on client devices 140*a-n*. However, in other embodiments, reporting program 112, reporting program 122, alert program 132, learning module 134, measurement data 136, model data 138, warning program 142 and feedback program 144 may be stored externally and accessed through a communication network, such as network 150. Network 150 can be, for example, a local area network (LAN), a wide area network (WAN) such as the Internet, or a combination of the two, and may include wired, wireless, fiber optic or any other connection known in the art. In general, network 150 can be any combination of connections and protocols that will support communications between measurement devices 110*a-n*, service providers 120*a-n*, alert system 130 and client devices 140*a-n*, in accordance with a desired embodiment of the present invention.

In various embodiments, alert system 130 gathers measurement data 136 from measurement devices 110*a-n* and service providers 120*a-n*. Measurement devices 110*a-n* each include a reporting program 112 that send measurements from one or more sensors (not shown) to measurement data 136. Each of the one or more sensors are communicatively coupled to the respective measurement device of measurement devices 110*a-n*. For example, each measurement device of measurement devices 110*a-n* may include one or more of the following sensors: anemometers, water current sensors, thermometer (both air and water), water quality sensors, and weather stations (with sensors for detecting current conditions, air visibility, lightning strikes, etc.). One of ordinary skill in the art will appreciate that any sensor or measurement apparatus that would impact, or be of interest in, the safety conditions of a body of water may be communicatively coupled to measurement devices 110*a-n* for reporting by the respective reporting program 112 without deviating from the invention.

In various embodiments, service providers 120*a-n* each include a reporting program 122 that send measurements or predictions to measurement data 136. In some embodiments, service providers 120*a-n* gather measurements from measurement devices 110*a-n*. In such embodiments, the respective reporting program 122 of the receiving service provider of service providers 120*a-n* sends the measurements to alert program 132. In some embodiments, the respective reporting program 122 of a service provider of service providers 120*a-n* provides one or more predictions of either weather conditions or other measurements that impact, or be of interest in, the safety conditions of a body of water.

In various embodiments, alert program 132 stores received measurements and predictions from measurement devices 110*a-n* and service providers 120*a-n* in measurement data 136. In various embodiments, measurement data 136 includes the values or conditions received from measurement devices 110*a-n* and service providers 120*a-n*. In some embodiments, measurement data 136 includes a time and location associated with each value and condition received from measurement devices 110*a-n* and service providers 120*a-n*.

In various embodiments, alert program 132 generates model data 138. Model data 138 includes various features associated with measurements in measurement data 136. For example, one feature in model data 138 is current wind speed. As will be discussed in detail herein, the latest reading in measurement data 136 of wind speed would be utilized in model data 138 for this feature. Another example feature in model data 138 is the average hourly wind speed. In this example, alert program 132 combines and averages all wind speed measurements in measurement data 136 to be utilized in model data 138 for this feature. Another example feature in model data 138 is average rainfall for a given location. In this example, alert program 132 combines and averages rainfall measurements in measurement data 136 collected from devices or sensors located within the area. One of ordinary skill in the art will appreciate that each feature in model data 138 may directly correspond to a measurement in measurement data 136 or may be a collection of measurements in measurement data 136 (such as, but not limited to, temporal (e.g., hourly, daily, etc.), spatial (e.g., combining measurements from various measurement devices 110*a-n* or service providers 120*a-n*), or statistical (e.g., minimum value, maximum value, $90^{th}$ percentile, etc.) without deviating from the invention.

Figure 4:
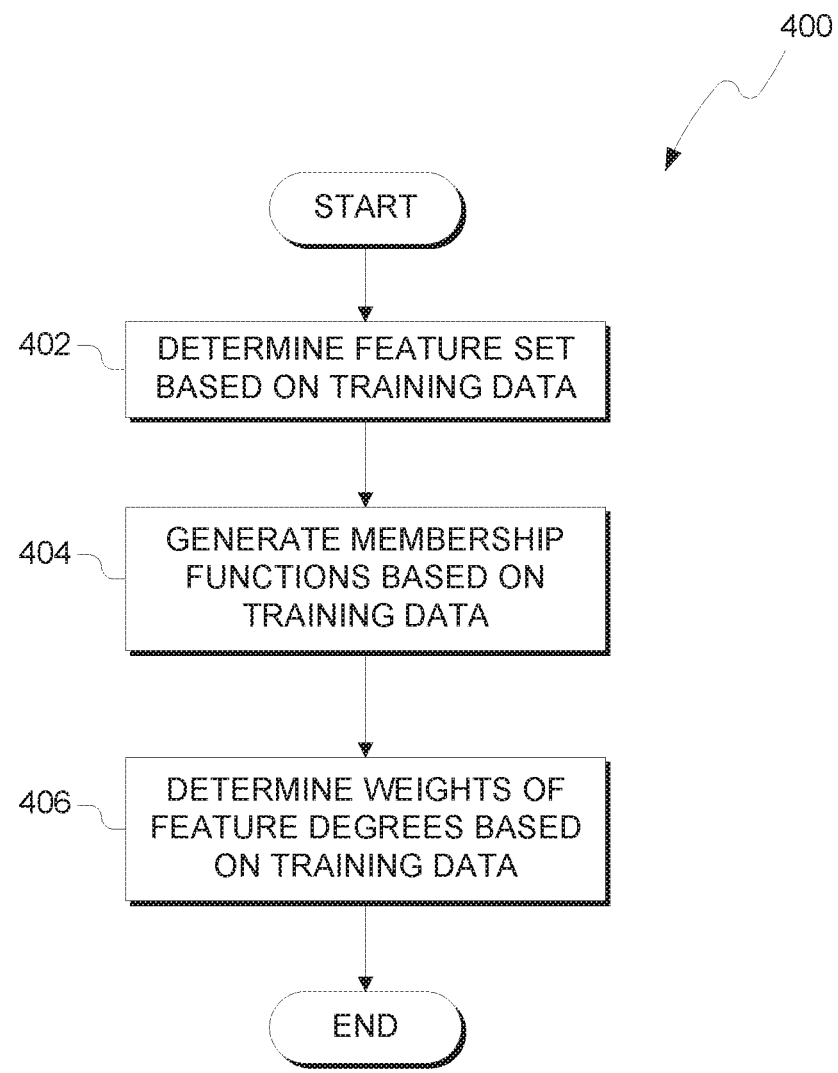
FIG. 4 illustrates operational processes of a learning module of an alert program on a computing device within the environment of FIG. 1, in accordance with an exemplary embodiment of the present invention.

In various embodiments, model data 138 includes a membership function for each feature. Membership functions map a features value to an interest value between zero (0) and one (1). Example membership functions are depicted in FIG. 4 as membership functions 210*a-c*. In various embodiments, model data 138 includes a weight associated with each feature. Based on the evaluation for a feature's value using the respective membership function for the feature, alert program 132 assigns the weight to the interest value determined for the measurement feature. As will be discussed herein, alert program 132 combines the weighted interest values of each selected feature to generate a safety index for a location or body of water. Based on the safety index's value, alert program 132 determines if an alert regarding the location's safety should be sent to one or more client devices 140*a-n*.

Figure 2:
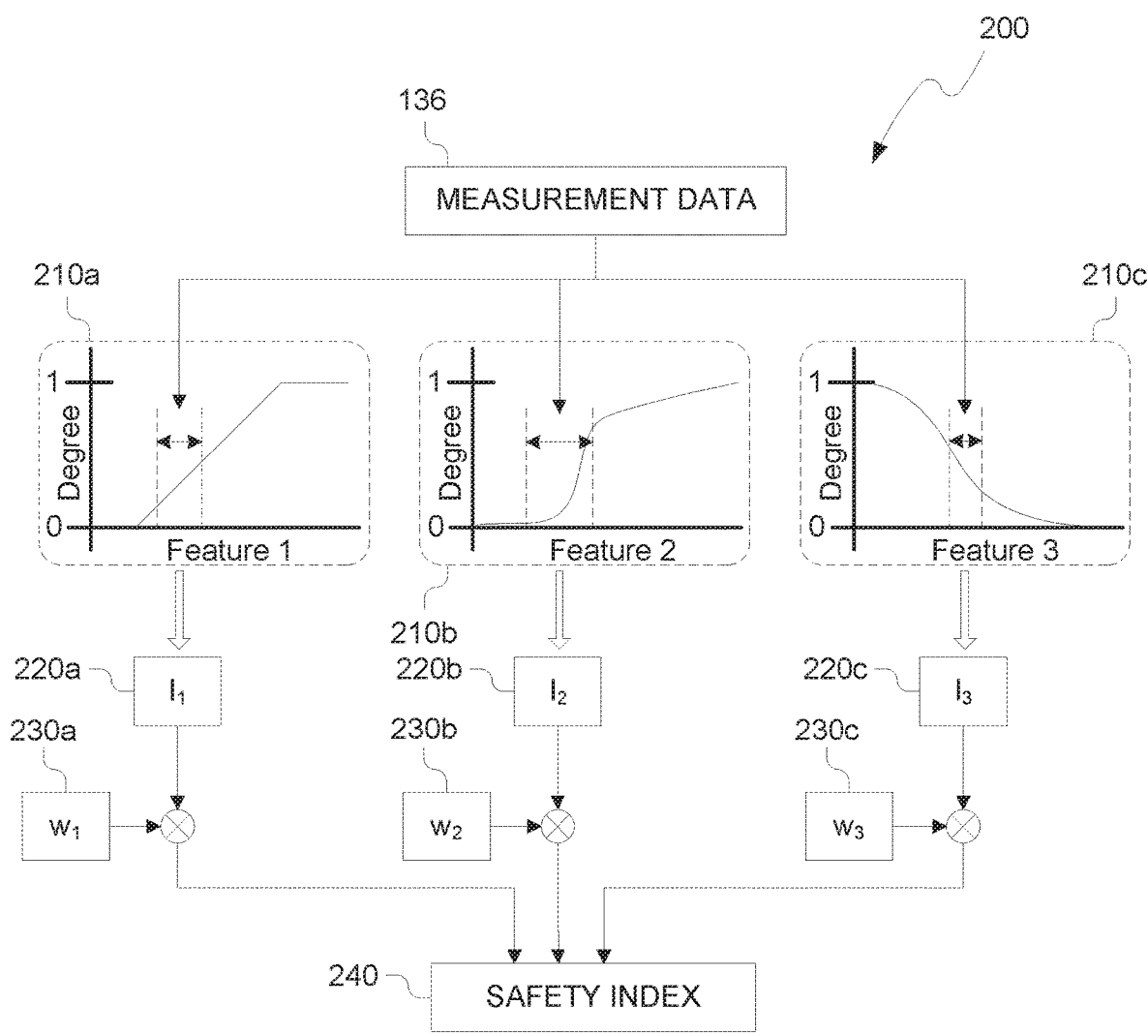
FIG. 2 depicts a block diagram of an example determination of a safety index based on a set of measurement data, in accordance with an exemplary embodiment of the present invention.

FIG. 2 depicts a block diagram, generally designated 200, illustrating a determination of safety index 240 based on a feature set of measurement data 136. Model data 138 includes membership functions 210*a-c* each associated with a feature derived from measurement data 136. For example, feature 1 of membership function 210*a* is associated with average hourly wind speed feature measured in meters per second; feature 2 of membership function 210*b* is associated with the latest cyanobacteria amount feature measured in micrograms per liter; and feature 3 of membership function 210*c* is associated with water temperature feature measured in degrees Celsius. Each of the membership functions 210*a-c* map value of each feature to a membership degree between 0 and 1, with 0 indicating that the feature has no or little impact or interest on water alert and 1 indicating that the feature is of high interest or has high impact on the water safety. In this example, looking at membership function 210*a*, lower wind speeds show a lesser degree of membership or interest of the windspeed feature in determining a water safety hazard. As wind speed increases, the degree of membership or interest of the feature increases indicating that higher wind speeds have a greater impact on water safety. As another example, looking at membership function 210*c* lower water temperature features have a higher degree of membership for water safety alerts than warmer temperatures. In various embodiments, the higher the degree of membership for a feature value is in membership functions 210*a-c*, the greater interest or impact the feature has on safety index 240. One of ordinary skill in the art will appreciate that membership functions 210*a-c* are provided for illustrative purposes and that any type or shape of membership function may be used without deviating from the invention.

In various embodiments, alert program 132 performs a fuzzification of measurement data 136 for each feature associated with membership functions 210*a-c*. Fuzzification takes a crisp deterministic value and translates it to a range of values as input to membership functions 210*a-c*. For example, alert program 132 evaluates membership function 210*a* for an average hourly wind speed feature. During this evaluation, alert program 132 determines average hourly wind speed to be twelve meters per second. Alert program 132 performs a fuzzification of "twelve meters per second" to cover a range of values covering the reading of "twelve meters per second". Looking at membership function 210*a* the arrow and dotted lines represent the selected range of values. In some embodiments, alert program 132 selects a uniform range of values from a measurement (e.g., +/−2 meters per second from 12 m/s). In other embodiments, alert program 132 selects a variance or standard deviation for the ranges from the measurement. One of ordinary skill in the art will appreciate that any method or technique may be utilize for fuzzification of features from measure data 136 without deviating from the invention.

In various embodiments, alert program 132 performs a de-fuzzification of the degree values determined by the ranged of feature values used in the membership function mapping to generate a "crisp" or discrete output value. Alert program 132 combines the various membership degree values into a single or crisp output value, this de-fuzzified number is used by alert program 132 as the degree value for the membership function. Returning to the example above where alert program 132 performs a fuzzification of "twelve meters per second", with the range 10-14 meters per second utilized. Looking at FIG. 2, membership function 210a has two vertical dotted lines indicating the 10 and 14 m/s boundaries. The selected range has a value mapping of 0.1 degree membership for 10 m/s and 0.4 degree membership for 14 m/s. Alert program 132 determines a single de-fuzzified value based on the range. For example, alert program 132 determines the de-fuzzified value based on, but not limited to, one or more of the following: a floor or minimum value (e.g., mf(10)=0.1), a maximum or ceiling value (e.g., mf(14)=0.4), a center or median value (e.g., mf(12)=0.25) or an average (e.g., finding area under the membership function divided by the range, i.e., the area under slope (0.075*mv−0.65) is 1 and divided by (14−10) or $mf_{avg}$=0.25).

In various embodiments, based on the fuzzified degree value and corresponding range of membership degree, alert program 132 determines a crisp or defuzzied value that represents the interest or impact the feature has relative to other features. For each feature applied to the membership function, alert program 132 generates interest values 220a-c. A larger interest value indicates how much the value from measurement data 136 for the feature impacts water safety for a location. Alert program 132 provides improvements in both flexibility and adaptability of water safety alert systems by utilizing the discussed fuzzification and defuzzification of features measurement data 136. In some scenarios, measurement data 136 may not be accurate or up to date. The membership functions and associated fuzzification of values and defuzzification of membership degrees provide less impact for potential error or accuracy of the readings of measurement data 136.

In various embodiments, alert program 132 perform a weighted summation of the interest values 220a-c with weights 230a-c. Based on the weighted sum, alert program 132 determines a safety index 240 for the location that indicates if the water conditions of the location present an unsafe environment or hazard for the public or private users of a location or body of water. For example, alert program 132 assigns more weight to a feature that is more important for a location or target group (e.g., a water temperature feature is weighted more for a public swimming area versus a shipping channel for freighters). Based upon a safety index 240 exceeding a predetermined threshold, alert program 132 determines if a warning or alert should be issued. For example, if safety index 240 exceeds 0.4 then alert program 132 generates an alert. In some embodiments, alert program 132 dynamically changes the weight of one or more interest values in the weighted some. For example, if an interest value is equal to 1.0 such as for a microbial contamination feature, then alert program 132 assigns the interest value for the feature a greater amount that typically assigned.

Referring back to FIG. 1, in some embodiments, client devices 140a-n each include a respective warning program 142. Based on the safety index for a location or body of water, warning program(s) 142 receive an alert from alert program 132 when the safety index for a location or body of water exceeds a pre-determined value. In some embodiments, alert program 132 includes information indicative of a group of client devices 140a-n associated with a location or body of water. For example, one or more users of client devices 140a-n subscribe for safety alerts to one or more locations. In other embodiments, each warning program 142 of client devices 140a-n provides current location information of client devices 140a-n to alert program. Alert program 132 sends alerts to warning program(s) 142 of client devices 140a-n that are within a pre-determined range of locations or bodies of waters that have associated safety alerts, based on the safety index for the locations.

In various embodiments, alert program 132 includes learning module 134. Learning module 134 applies machine learning to model data 138 to improve the accuracy of alert program 132 when determining and sending alerts to warning program(s) 142 of client devices 140a-n. In some embodiments, learning module 134 provides supervised machine learning of model data 138. Supervised machine learning algorithms received a data set in conjunction with a label or classification for the data set. In such embodiments, learning module 134 receives one or more measurements associated with a situation or scenario that had either generated or should have generated a water safety alert, or conversely situations that did not warrant the water safety alert. Learning module 134 applies the measurements to the current model data 138 to determine a safety index as in the same manner discussed above with alert program 132 (i.e., learning modules 134 selects features, learning module 134 fuzzifies features and applies the fuzzified values to membership functions, learning module 134 determines membership degrees and interest values for each feature, learning module 134 determines a weighted sum of the interest values, and if the weighted sum is above a predetermined value the conditions would be indicated to create an alert). If learning module 134 determines the model data 138 indicates a safety index that conflicts with the supplied label in the supervised training set, then learning module 134 updates model data 138 such that the model correctly accounts for the situation and measurements provided in the supervised training data.

As discussed herein, model data 138 includes fuzzy logic models or membership functions that fuzzify measurements and defuzzify membership degrees associated with the measurements. In various embodiments, learning module 134 updates or changes one or more of the membership functions, range or amount of fuzzification and the defuzzification algorithm to train or match model data 138 to the received supervised training data. In some embodiments, learning module 134 update or change the selected features from measurement data 136, weights applied to interest values, or the predetermined threshold used to identify alerts. In some embodiments, learning module 134 changes one or more of the above portions of model data 138, feature set of measurement data 136, weights applied to interest values and the safety index threshold.

Based on the one or more changes, learning module 134 determines an updated safety index. When the safety index changes the alert label to match the training label (i.e., the training data indicated an "alert" state but model data 138 initially generated a "no alert" state with change to model data and changes to model data 138 later reflects to training label of "alert"), then learning module 134 saves the model data 138 for use by alert program 132 to determine and generate water safety alerts as discussed herein. In some embodiments, client devices 140a-n each include a respective feedback program 144. In some scenarios, users of feedback program 144 provide indication or other input of the correctness to alerts received from alert program 132. In such embodiments, users provide a relabeling of one or more previous alerts that indicates that an alert or clear indication was incorrect.

Figure 3:
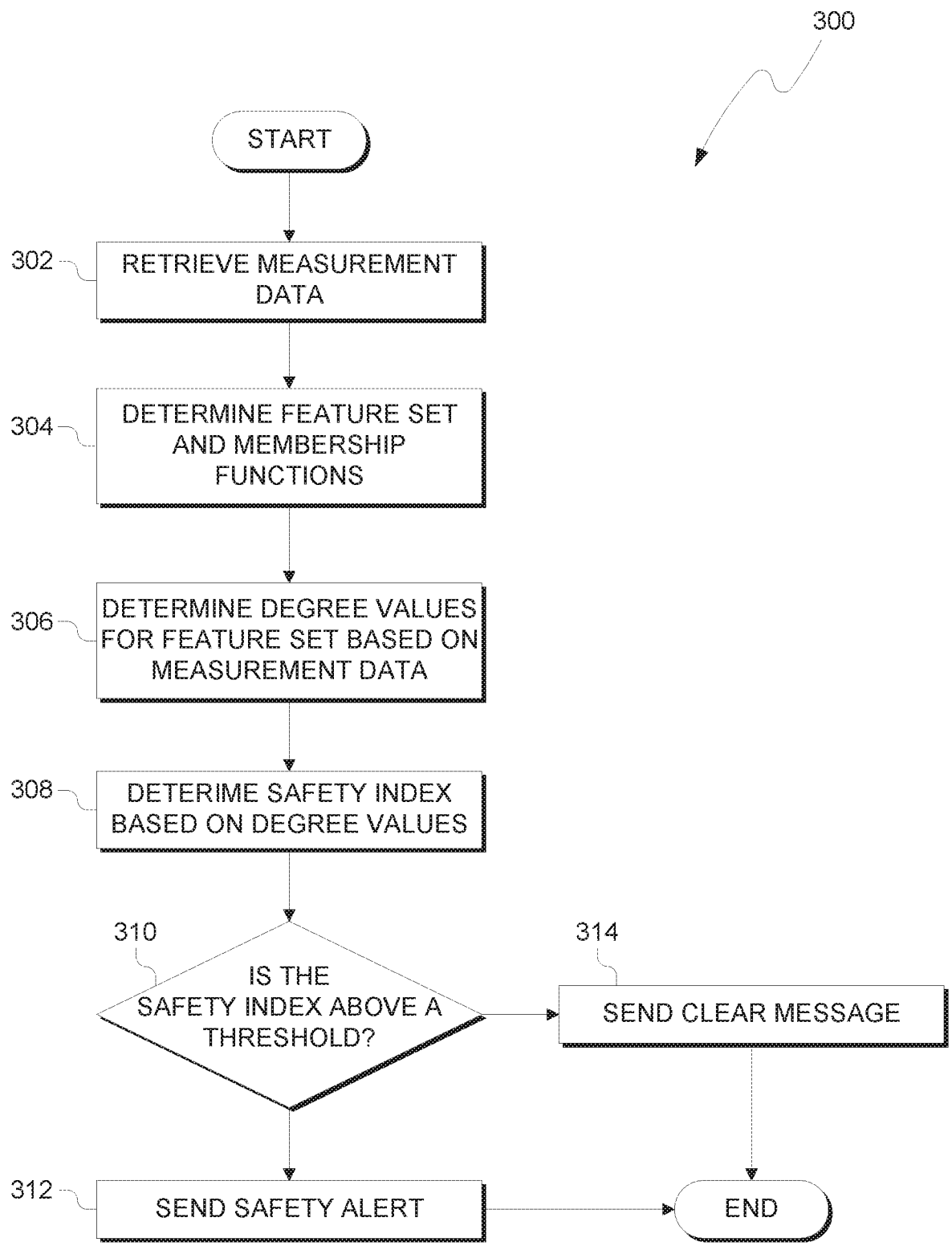
FIG. 3 illustrates operational processes of an alert program on a computing device within the environment of FIG. 1, in accordance with an exemplary embodiment of the present invention.

FIG. 3 illustrates operational processes, generally designated 300, of alert program 132 on alert system 130 within the environment of FIG. 1. In process 302, alert program 302 retrieves measurement data 136. Various measurement devices 110a-n and service providers 120a-n provide sensor data and prediction data related to a location or body of water. In process 304, alert program 132 determines the feature set to be used in determining a water safety alert for the location. In some embodiments, certain locations have different feature sets based on the needs or qualities of the location or body of water that an alert is being determined. For example, a public swimming area includes a water temperature feature in the feature set, where a shipping channel in a harbor does not include the water temperature in the feature set. Based on the selected feature set, alert program 132 retrieves the associated membership functions (e.g., 210a-c of FIG. 2) of the selected features from model data 138.

In process 306, alert program 132 determines the interest values for each feature in the feature set. As discussed herein, alert program 132 retrieves measurement data 136 for the relevant measurements, sensor readings and the like for each feature. Based on the retrieved measurement data 136, alert program determines a measurement value. In some scenarios, the latest reading in measurement data 136 is used (e.g., current rainfall). In other scenarios, alert program 132 combines more than one sensor reading (e.g., daily rainfall). In various embodiments, alert program 132 generates a range of values (i.e., fuzzification) for the measurement value. Alert program 132 identifies a portion of the membership function that correspond to the range of values. Based on the identified portion of the membership function, alert program 132 determines an interest value (e.g., 220a-c of FIG. 2) associated with the measurement value of the feature.

In process 308, alert program 132 determines a safety index (e.g., 240 of FIG. 2) based on a weighted sum of the interest values. Each weight (e.g., 230a-c of FIG. 2) applies an importance to the interest values of features in the feature set. In some embodiments, the weights applied to each feature may change based on location, the type of body of water, or the type of activity that is the subject of the alert. Based on the weighted sum used to determine the safety index, alert program 132 determines if the safety index is above a threshold value (decision process 310). If the safety index is above a threshold value (YES branch of decision process 310), then alert program 132 sends a water safety alert to one or more client devices 140a-n (process 312). The warning program(s) 142 of the recipient client devices 140a-n provide an alert to the potentially unsafe conditions associated with the location or body of water. In some embodiments, alert program 132 includes an indication of a feature or condition that has the greatest impact on the safety alert. For example, alert program 132 selects the feature with the greatest interest value of the feature set and provides an indication that the impact of the feature may have (e.g., "High Winds!" or "Frequent Lightning").

If the safety index is below the threshold, then alert program 132 sends a clear message to one or more client devices 140a-n (process 314). In some embodiments, alert program 132 does not send any message or alert when safety index is below a threshold value. In some embodiments, alert program 132 selects different threshold values for the safety index. Certain locations may have a higher tolerance for certain conditions. In such scenarios, alert program 132 selects a higher threshold value for safety index. Alert program 132 continually operates processes 300 while receiving supervised training data from external sources, such as feedback program 144 of client devices 140a-n.

FIG. 4 illustrates operational processes, generally designated 400, of learning module 134 of alert program 132 on a computing device within the environment of FIG. 1. In various scenarios, learning module 134 receives training data that indicates that a previous alert or clear message (e.g., previous instances processes 312 and 314) where incorrect. Based on the conditions or measurement data 136 at the time as well as the information in the training data, learning module 134 updates the model data 138 as well as the weights and threshold values used in calculating the safety index for the locations or types of bodies of water.

In process 402, based on the received supervised training data, learning module 134 determines updates to the selected feature set for the type of location or body of water. In some embodiments and scenarios, the supervised training data includes a corrected alert message that reclassifies the message previously sent (e.g., an alert or a clear message was incorrectly sent). Additionally, the supervised training data includes one or more additional features not utilized in the previous message or alert. In such scenarios, learning module 134 updates alert program 132 to include such features in further alerts (e.g., later instances of process 304 include the unutilized features).

In some scenarios and embodiments, learning module 134 provides unsupervised training. Unsupervised training includes machine learning algorithms that are performed without input from outside sources (e.g., feedback program 144). In such embodiments and scenarios, training module 134 keeps track of previous alerts or clear messages. For features whose interest values tend to be lower in a series of historical safety alerts, then training module 134 remove the feature from future selections. For features whose interest values tend to be higher in a series of historical clear messages, then learning module 134 may increase the frequency of the feature in future feature selections.

In process 404, learning module 134 determines updates to the membership functions based on the training data. In some embodiments and scenarios, learning module 134 makes changes to one or more of the following model data 138: the shape or function of the membership functions, the fuzzification range for various measurement values, and the defuzzification algorithm for a given portion of the membership functions. In training scenarios where previous alerts where false positives, learning module 134 performs one or more of the following: lowers the degree value of the membership functions in the previously selected range, lessens the range of fuzzification, or selects a less favorable defuzzification algorithm (e.g., changing a ceiling function to a floor function). In training scenarios where alerts where not properly issued and clear messages were made instead, learning module 134 performs one or more of the following: raises the degree value of the membership functions in the previously selected range, increases the range of fuzzification, or selects a more favorable defuzzification algorithm (e.g., changing a floor function to a ceiling function).

In process 406, learning module 134 determines updates to the weights applied to interest values based on the training data. In some embodiments and scenarios, supervised training data includes information indicating that a feature was accounted for but not properly attributed. In response, learning module 134 increases the weight used by alert program 132 associated with the feature. Conversely, if the supervised training data indicates that a feature was overly relied upon, learning module 134 decreases the weight used by alert program 132 associated with the feature. In some scenarios and embodiments, training module 134 provides unsupervised training. In such embodiments and scenarios, learning module 134 keeps track of previous alerts or clear messages. For features whose interest values tend to be lower in a series of historical safety alerts, then learning module 134 decreases the weight of the feature. For features whose interest values tend to be higher in a series of historical safety alerts, then learning module 134 increases the weight of the feature.

Figure 5:
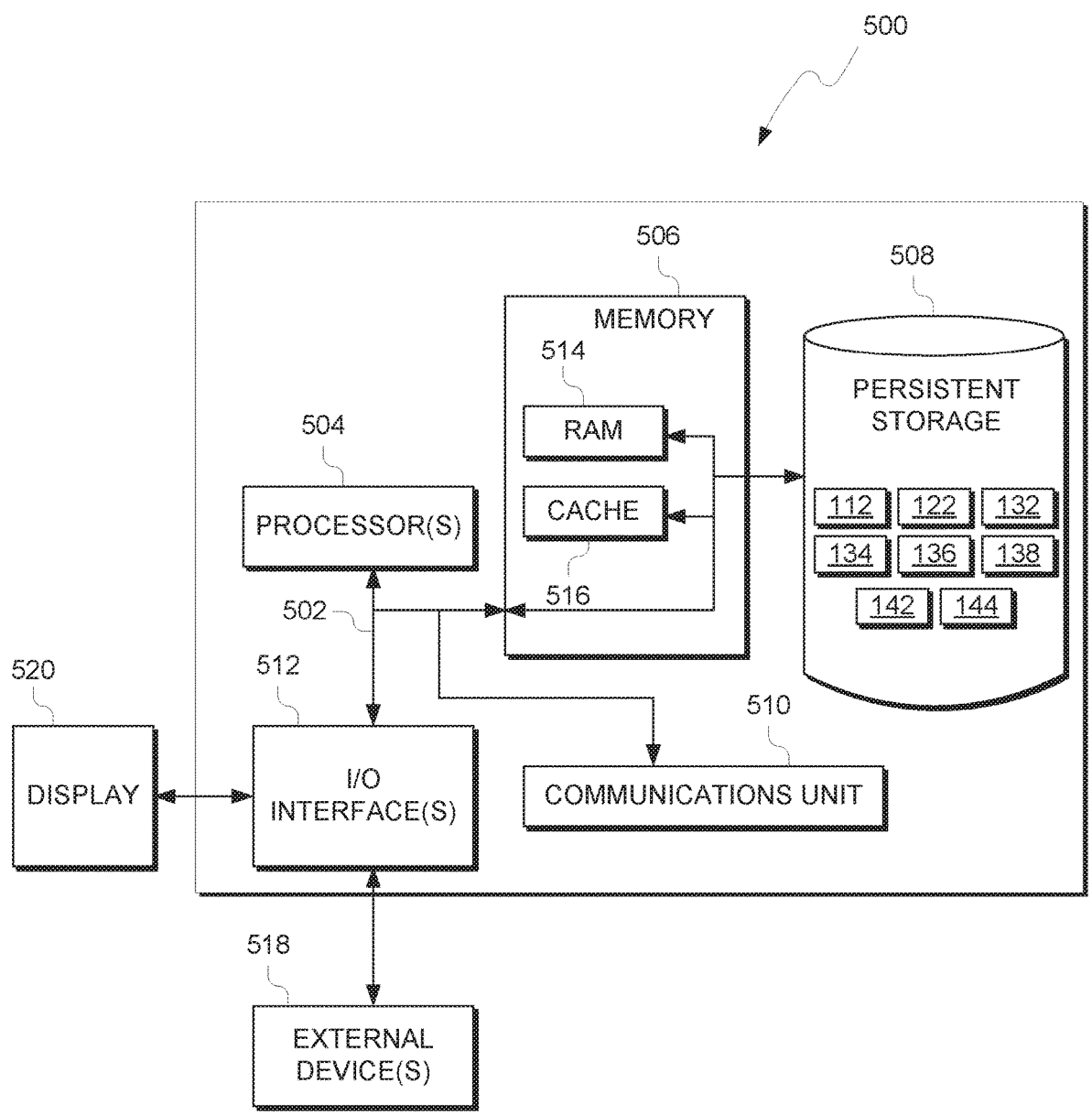
FIG. 5 depicts a block diagram of components of the computing device executing an alert program, reporting programs, warning programs and feedback programs, in accordance with an exemplary embodiment of the present invention.

FIG. 5 depicts a block diagram, 500, of components of measurement devices 110a-n, service providers 120a-n, alert system 130 and client devices 140a-n, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Measurement devices 110a-n, service providers 120a-n, alert system 130 and client devices 140a-n each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Reporting program 112, reporting program 122, alert program 132, learning module 134, measurement data 136, model data 138, warning program 142 and feedback program 144 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 150. In these examples, communications unit 510 includes one or more network interface cards. Communications unit 510 may provide communications through the use of either or both physical and wireless communications links. Reporting program 112, reporting program 122, alert program 132, learning module 134, measurement data 136, model data 138, warning program 142 and feedback program 144 may be downloaded to persistent storage 508 through communications unit 510.

I/O interface(s) 512 allows for input and output of data with other devices that may be connected to measurement devices 110a-n, service providers 120a-n, alert system 130 and client devices 140a-n. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., reporting program 112, reporting program 122, alert program 132, learning module 134, measurement data 136, model data 138, warning program 142 and feedback program 144, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   retrieving, by one or more processors, a plurality of measurements associated with a location;
   determining, by the one or more processors, a set of features based on the plurality of measurements;
   identifying, by the one or more processors, a set of fuzzy-logic membership functions for the set of features;
   determining, by the one or more processors, a safety index for a body of water based, at least in part, on (i) the set of fuzzy-logic membership functions and (ii) one or more input value ranges for the set of features;
   in response to the safety index being above a threshold value, sending, by the one or more processors, an alert to one or more users regarding the location; and
   in response to the alert being a false positive, altering, by the one or more processors, a shape of at least one fuzzy-logic membership function of the set of fuzzy-logic membership functions.

2. The method of claim 1, the method further comprising:
   determining, by the one or more processors, a portion of at least one membership function of the set of fuzzy-logic membership functions based on an input value range for a feature associated with the at least one membership function; and
   determining, by the one or more processors, an output value of the feature based, at least in part, on the portion of at least one membership function.

3. The method of claim 2, wherein the output value is based, at least in part, on one or more of the following operations: (i) a maximum output value for the determined portion of at least one membership function; (ii) a minimum output value for the determined portion of at least one membership function; (iii) a median output value for the determined portion of at least one membership function; and (iv) an average of output values for the determined portion of at least one membership function.

4. The method of claim 1, wherein the safety index of the location is further based, at least in part, on a weighted average of output values associated with the set of fuzzy-logic membership functions.

5. The method of claim 4, the method further comprising:
receiving, by the one or more processors, one or more training data sets; and
updating, by the one or more processors, one or more of the following based on the one or more training sets: (i) a different selection of features from the set of features; (ii) one or more values of the set of fuzzy-logic membership functions; and (iii) one or more weights of the weighted average of output values associated with the set of fuzzy-logic membership functions.

6. The method of claim 5, wherein the one or more training data sets include supervised training data from at least one feedback program.

7. The method of claim 5, wherein the one or more training data sets include unsupervised training data determined from historical data.

8. A computer program product comprising:
one or more computer-readable storage media and program instructions stored on the one or more computer-readable storage media, the program instructions comprising:
program instructions to retrieve a plurality of measurements associated with a location;
program instructions to determine a set of features based on the plurality of measurements;
program instructions to identify a set of fuzzy-logic membership functions for the set of features;
program instructions to determine a safety index for a body of water based, at least in part, on (i) the set of fuzzy-logic membership functions and (ii) one or more input value ranges for the set of features;
in response to the safety index being above a threshold value, program instructions to send an alert to one or more users regarding the location; and
in response to the alert being a false positive, program instructions to alter a shape of at least one fuzzy-logic membership function of the set of fuzzy-logic membership functions.

9. The computer program product of claim 8, the program instructions further comprising:
program instructions to determine a portion of at least one membership function of the set of fuzzy-logic membership functions based on an input value range for a feature associated with the at least one membership function; and
program instructions to determine an output value of the feature based, at least in part, on the portion of at least one membership function.

10. The computer program product of claim 9, wherein the output value is based, at least in part, on one or more of the following operations: (i) a maximum output value for the determined portion of at least one membership function; (ii) a minimum output value for the determined portion of at least one membership function; (iii) a median output value for the determined portion of at least one membership function; and (iv) an average of output values for the determined portion of at least one membership function.

11. The computer program product of claim 8, wherein the safety index of the location is further based, at least in part, on a weighted average of output values associated with the set of fuzzy-logic membership functions.

12. The computer program product of claim 11, the program instructions further comprising:
program instructions to receive one or more training data sets; and
program instructions to update one or more of the following based on the one or more training sets: (i) a different selection of features from the set of features; (ii) one or more values of the set of fuzzy-logic membership functions; and (iii) one or more weights of the weighted average of output values associated with the set of fuzzy-logic membership functions.

13. The computer program product of claim 12, wherein the one or more training data sets include supervised training data from at least one feedback program.

14. The computer program product of claim 12, wherein the one or more training data sets include unsupervised training data determined from historical data.

15. A computer system comprising:
one or more computer processors;
one or more computer readable storage media; and
program instructions stored on the computer readable storage media for execution by at least one of the one or more processors, the program instructions comprising:
program instructions to retrieve a plurality of measurements associated with a location;
program instructions to determine a set of features based on the plurality of measurements;
program instructions to identify a set of fuzzy-logic membership functions for the set of features;
program instructions to determine a safety index for a body of water based, at least in part, on (i) the set of fuzzy-logic membership functions and (ii) one or more input value ranges for the set of features;
in response to the safety index being above a threshold value, program instructions to send an alert to one or more users regarding the location; and
in response to the alert being a false positive, program instructions to alter a shape of at least one fuzzy-logic membership function of the set of fuzzy-logic membership functions.

16. The computer system of claim 15, the program instructions further comprising:
program instructions to determine a portion of at least one membership function of the set of fuzzy-logic membership functions based on an input value range for a feature associated with the at least one membership function; and
program instructions to determine an output value of the feature based, at least in part, on the portion of at least one membership function.

17. The computer system of claim 16, wherein the output value is based, at least in part, on one or more of the following operations: (i) a maximum output value for the determined portion of at least one membership function; (ii) a minimum output value for the determined portion of at least one membership function; (iii) a median output value for the determined portion of at least one membership function; and (iv) an average of output values for the determined portion of at least one membership function.

18. The computer system of claim 15, wherein the safety index of the location is further based, at least in part, on a weighted average of output values associated with the set of fuzzy-logic membership functions.

19. The computer system of claim 18, the program instructions further comprising:
   program instructions to receive one or more training data sets; and
   program instructions to update one or more of the following based on the one or more training sets: (i) a different selection of features from the set of features; (ii) one or more values of the set of fuzzy-logic membership functions; and (iii) one or more weights of the weighted average of output values associated with the set of fuzzy-logic membership functions.

20. The computer system of claim 19, wherein the one or more training data sets include supervised training data from at least one feedback program.

\* \* \* \* \*